July 18, 1961  N. D. GREENE ET AL  2,992,977
SALT WATER CONVERSION
Filed July 2, 1959  2 Sheets-Sheet 1

INVENTORS
NORMAN D. GREENE
HEINZ F. POPPENDIEK
BY
ATTORNEY

July 18, 1961
N. D. GREENE ET AL
2,992,977
SALT WATER CONVERSION
Filed July 2, 1959
2 Sheets-Sheet 2
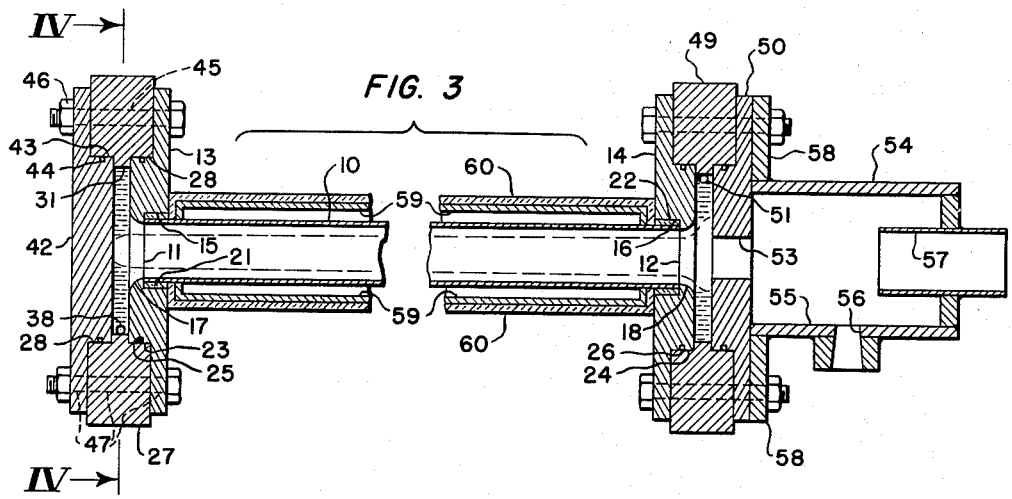
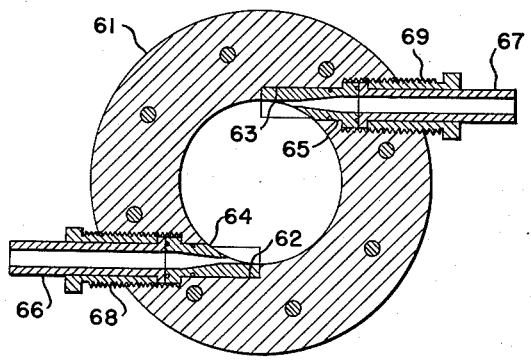
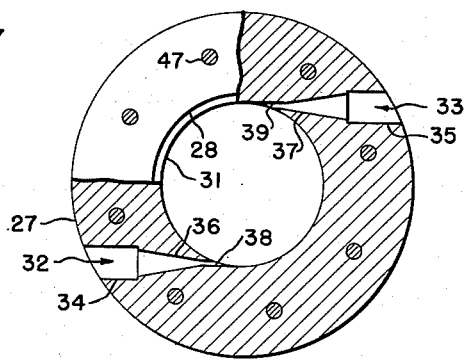
INVENTORS
NORMAN D. GREENE
HEINZ F. POPPENDIEK
BY
*Walter J. Jasui*
ATTORNEY

2,992,977
SALT WATER CONVERSION

Norman D. Greene, and Heinz F. Poppendiek, La Jolla, Calif., assignors to General Dynamics Corporation, San Diego, Calif., a corporation of Delaware
Filed July 2, 1959, Ser. No. 824,539
8 Claims. (Cl. 202—64)

The present invention generally relates to the conversion of saline water into fresh water, and more particularly relates to a method and apparatus for vaporization of saline water.

While there are presently many approaches available for the desaltation of saline water, such as separation by freezing, solar distillation, osmotic processes, etc., the most widely used desaltation process in existing installations is that of thermal distillation. In this process the saline water is brought to its vaporization temperature, vapor is boiled off, and the vapor is condensed into pure water.

Unfortunately, however, there are many disadvantages associated with present day methods and equipment for thermal distillation that make it uneconomical except for the most arid areas on earth. One of these disadvantages is the low heat transfer rates which have been achieved. Another disadvantage is the entrainment of impurities in the vapor due to poor vapor separation. And still another disadvantage is the salt deposit and encrustation of the heat transfer surfaces. This latter problem is quite severe for it results in frequent and systematic shut-downs to permit cleaning or replacement of the boilers. The maintenance costs involved in such operations are a prime contribution towards rendering the whole process uneconomical.

In contrast with this, the present invention produces much higher heat transfer rates and evaporation rates. The high heat transfer rates, in addition to producing faster heating of the saline water, permit a great reduction in the total area of the heat transfer surfaces. Still further, the present invention essentially eliminates the encrustation of heat transfer surfaces, and thereby effects a considerable reduction in maintenance costs.

It is, therefore, an object of the present invention to provide a more economical method for the conversion of saline water into fresh water.

Another object is to provide a much more efficient method of vaporizing saline water.

Another object is to provide a method of saline water conversion which effects high rates of heat transfer and improved vapor separation.

Another object is to provide a method of saline water conversion which substantially eliminates salt deposits and encrustation on heat transfer surfaces.

Another object is to provide a method of vaporizing saline water which permits a considerable reduction in the total area of heat transfer surfaces.

Another object of the present invention is to provide an apparatus for the more economical thermal distillation of saline water.

Another object is to provide an apparatus for sustaining a vortex of saline water, directing saline water into and removing saline water from such vortex, applying heat to the exterior of such vortex, and collecting non-saline water vapor from the open center of such vortex.

And still other objects and features of the present invention will be readily apparent to those skilled in the art from the following specification and appended drawings wherein is illustrated a preferred form of the invention, and in which:

FIGURE 3 is a cross-sectional view of a saline water vaporizing apparatus;

FIGURE 4 is a cross-sectional view taken along line IV—IV of FIGURE 3; and

FIGURE 5 is a cross-sectional view of an alternative inlet means.

Figure 1:
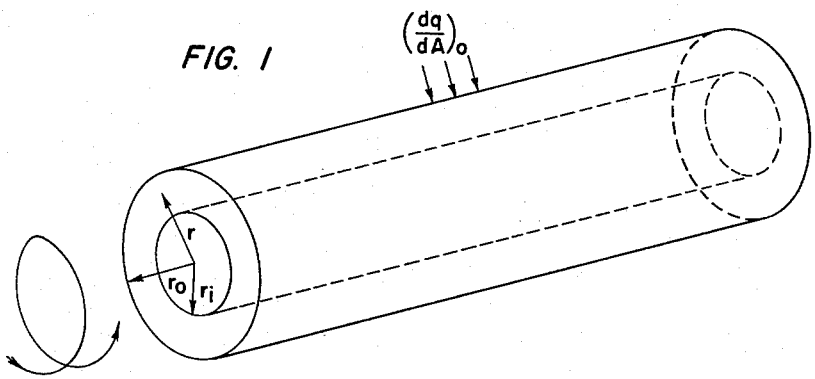
FIGURE 1 is a schematic diagram of a vortex of saline water.

Referring now to the drawings, FIGURE 1 shows a schematic representation of a vortex of saline water as it would exist in a cylinder. The arrow in FIGURE 1 indicates the direction of flow of the saline water. The symbols $r_0$, $r_1$, and $r$ represent, respectively, the outside radius of the vortex, the inside radius, and any radius between the two. The quantity $$\left(\frac{dq}{dA}\right)_0$$

represents the "heat flux" into the saline water at $r_0$. More precisely, it is the differential heat $(dq)$ flowing through a differential area $(dA)$ at the outer radius $r_0$. This schematic, with symbols, will serve as an aid in the discussion and understanding of some of the features of the instant invention.

Figure 2:
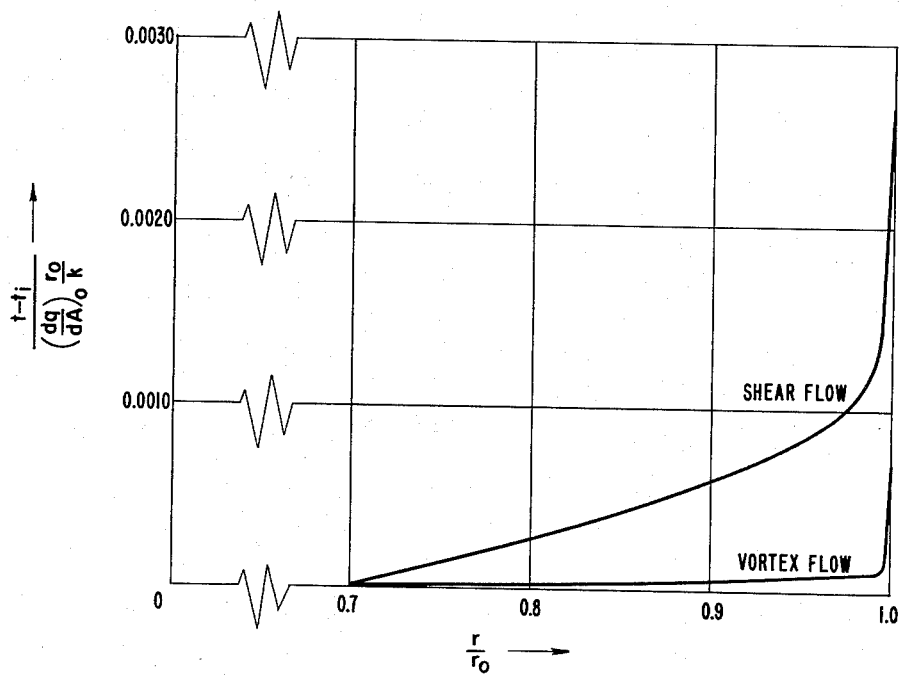
FIGURE 2 is a graph which compares the heat transfer characteristics of vortex flow with those of shear flow.

By using a "vortex" flow of saline water it is possible to achieve much higher heat transfer rates within the saline water than would be achieved by using ordinary "duct" flow of saline water. This is illustrated by the graph of FIGURE 2 in which the effect of two types of flow are shown. The ordinate of the graph is a dimensionless quantity $$\frac{t-t_1}{\left(\frac{dq}{dA}\right)_0 \frac{r_0}{K}}$$

in which $t_1$ is the water temperature at the inside radius $r_1$ and $t$ is a variable, being the temperature at points between $r_1$ and $r_0$. The quantity $K$ is the appropriate constant of thermal conductivity. The abscissa of the graph is a dimensionless ratio $$\frac{r}{r_0}$$

A macroscopic heat-transfer analysis of the idealized salt water conversion system in which radial heat flow is described in terms of an eddy diffusivity was conducted. FIGURE 2 illustrates two radial temperature distributions for the case where all the heat added to the salt water at the pipe heat-transfer surface is removed at the free vortex surface by vaporization. The shear flow temperature profile was calculated by using eddy diffusivities for wall shear alone. Wall shear is responsible for the turbulence produced in ordinary duct flow. The vortex flow temperature distribution was calculated by using eddy diffusivities which were increased above the shear diffusivities by the measured vortex to normal heat-transfer coefficient ratio obtained in a parallel-walled channel at the same Reynolds number. This second eddy diffusivity distribution includes the effect of vortex flow. The Reynolds number was determined from the mean, vectorial velocity and the equivalent diameter. The postulate that the eddy diffusivity distribution is governed by wall shear is reasonable because the ratio of free surface to pipe wall diameter has been found experimentally to be about 0.7. The second and more realistic postulate, that the eddy diffusivities are larger than those which correspond to the normal shear values, arises from a free convection process and is supported by experimental data and elementary theory.

In the presence of the strong radial convection within the vortexing fluid, the normal thicknesses of the various hydrodynamic layers into which a flowing fluid is divided to evaluate its diffusivity would be substantially decreased. The radial convection effect further decreases the radial temperature distribution curve below that shown by the vortex flow curve of FIGURE 2. Therefore, the values shown constitute a conservative estimation.

Looking at the curves now, it is seen that in order for the saline water to have a temperature $t_1$ at the inner radius $r_1$ then it must have a higher temperature at the point $r=r_0$. If the water is in "shear" flow then the temperature required at $r_0$ to produce any $t_1$ at $r_1$ is greater than would be required if the water were in vortex flow. In both curves, the heat flux at $r_0$ had the same value, i.e., $$\left(\frac{dq}{dA}\right)_0$$

In order for there to be any heat at all however, the temperature of that substance used to heat the water must be greater than the temperature of the water itself. Thus, if steam were used to heat the container about the water then the temperature of the steam would have to be greater for shear flow of water than for vortex flow in order to produce a certain temperature at any point in the water. Suppose the temperature desired in the saline water is the temperature of vaporization, with the vapor to be condensed into fresh water; then the higher the temperature of working steam required, the higher the cost of the resultant fresh water. Obviously then, the use of vortex flow is much more economical than the use of shear flow. And this is true whether steam, electrical power, or a nuclear reactor or the like is used to heat the saline water.

An additional factor improving economy is the fact that vortex flow results in better vapor separation and consequent vapor that is relatively pure, making the resultant fresh water more fit for human consumption. Further, less heating surface area is required, so that equipment costs are reduced.

As previously mentioned, the instant invention also substantially eliminates salt deposit and encrustation on heat transfer surfaces. This too is a result of utilizing a vortex flow of saline water in a boiler. This can be explained in a qualitative manner, with refeernce again being made to FIGURE 1. Since the water is moving in a vortex it experiences centrifugal forces which tend to force the water outward toward the outer radius $r_0$. Thus, the water at $r_0$ is under pressure caused by the mass of water positioned centrally therefrom. From this it can be seen that the water pressure continually increases in the vortex as $r$ increases from $r_1$ to $r_0$. The temperature in the water, however, does not increase with $r$ at the same rate as the pressure. This can be understood somewhat by noticing that the vortex flow curve in FIGURE 2 is relatively flat.

Now it must be remembered that the temperature at which water will vaporize depends on the pressure to which it is subjected. This is why water will boil on a mountain top at a temperature much less than that required at sea level. Because the radial rate of pressure and corresponding saturation temperature increase is greater than the radial rate of temperature increase within the vortex, the vaporization of the water will occur at or near the inner free vortex surface, or at radius $r_1$, of the vortex. At any other point within the vortex the pressure will be too great for the corresponding temperature to cause vaporization.

This is important in that the salt in saline water, to a significant extent, crystalizes out where vaporization occurs, or at that point where pure water is taken from the solution. Ordinarily this occurs at the heating surfaces, the inner surfaces of the boiler. The minute surface irregularities provide points at which the saline water can easily vaporize. This process is sometimes referred to as "nucleation." Unfortunately, such ordinary vaporization processes result in a deposit or encrustation of salt on the heating surfaces. Such deposits impair the efficiency of the system and must be continually removed.

As has been shown however, vaporization in a vortex flow occurs at or near the inner radius of the vortex, thus substantially no encrustation of the heat transfer surfaces occurs. Further, it is well known that the solubilities of the majority of ocean salts increase with pressure, and since the pressure is greatest at the heat transfer surfaces then the salts in the saline water will be more soluble there.

From the preceding it is clear that saline water can be very efficiently vaporized by causing it to flow in a vortex, applying heat to the vortex exterior, and collecting water vapor from the center of the vortex. The FIGURES 3, 4, and 5 depict an apparatus for this type of efficient saline water conversion. Referring to FIGURE 3, the apparatus is shown therein as including a cylinder 10 having an open ends 11 and 12. The cylinder is manufactured from a material which is a heat conductor, as opposed to an insulator. Many metals have good heat transfer characteristics which would make them suitable.

Adjacent open cylinder ends 11 and 12 are collar members 13 and 14 respectively. Collar members 13 and 14 have counterbored holes positioned therethrough which are divided into counterbored sections 15, 16 and hole sections 17, 18. Hole sections 17, 18 have a diameter that is the same as the interior of cylinder 10. Cylinder 10 is positioned in counterbored sections 15, 16 and bottomed therein in alignment with hole sections 17 and 18 so that they actually extend the cylindrical passage of cylinder 10. Non heat conducting insulation washers 21 and 22 are disposed about the end portions of cylinder 10 within counterbored whole sections 15, 16 to insulate the cylinder, act as a fluid seal, and hold it in alignment with hole sections 17 and 18. Both hole sections 17 and 18 have flared open ends, so that the extended cylindrical passage formed by the hole sections has flared open ends.

Collar members 13, 14 have substantially circular cross sections, but their peripheries are stepped so that circular step portions 23, 24 are positioned around the collar members on one side thereof. As shown in FIGURE 3, these step portions face in the same direction as the flared openings of hole sections 17, 18. The step portions contain O-ring groove and seal arrangements 25, 26 for fluid seal purposes.

Positioned adjacent collar member 13 is a spacer element 27. Spacer element 27 has a substantially cylindrical hole 28 therethrough. A rectangular cross sectioned ridge 31 divides holes 28 into two sections, one of which fits over step 23 of collar member 13. The inner surface of ridge 31 forms a circular surface, so that the ridge provides a cylinder lying adjacent collar member 13 and concentrically about the flared opening therein.

As can be seen from FIGURES 3 and 4, spacer element 27 has a pair of diametrically opposite inlets 32 and 33. These inlets include cylindrical portions 34 and 35 which can accommodate external conduits or the like, convergent nozzle portions 36 and 37, and nozzle outlets 38 and 39. The nozzle outlets 38 and 39 intersect the surface of ridge 31 at a tangent so that any liquids forced therethrough will necessarily contact the ridge surface at a tangent.

An end plate 42, quite similar to collar member 13, is disposed adjacent spacer element 27 to close hole 28 and, in conjunction with ridge 31, form a rather flat cylindrical chamber. End plate 42 has a stepped section 43 which protrudes into hole 28 and lies adjacent ridge 31. This stepped section includes an O-ring groove and seal arrangement 44 which cooperates with the wall of hole 28 to provide a fluid seal. End plate 42, spacer element 27, and collar member 13 are all held securely together by a plurality of bolts 45 and nuts 46 which pass through holes 47 common to all three pieces and in proper alignment.

A somewhat similar arrangement of a collar member 14, spacer element 49, and end plate 50 are shown adjacent open end 12 of cylinder 10. Spacer element 49, instead of having inlets, has an outlet 51. Outlet 51, just as the inlets of spacer element 27, intersects the ridge surface of spacer element 49 at a tangent. The end plate 50 does not entirely close the opening through the spacer element however, for it has a vapor vent or outlet 53 centrally positioned with respect to end 12 of cylinder 10.

Vapor vent 53 opens into a water trap chamber 54 which is disposed adjacent end plate 50. Chamber 54 has a floor 55 that is below vent 53, and a water drain 56 is located in floor 55. A vapor outlet 57 is positioned above the chamber floor and can accommodate a conduit for carrying off vapor. Chamber 54 has a flange 58 which is bolted to end plate 50, thus securing the chamber thereto.

Thus, a saline water inlet is provided at one end of cylinder 10 and a saline water outlet and a vapor outlet are provided at the other end. The length of cylinder 10 however, is almost entirely enclosed by a steam duct 59 which, in turn, is covered with suitable insulation 60 to prevent heat loss.

FIGURE 5 of the drawings shows a cross section of a spacer element 61 with alternative inlet means. The inlet passages themselves have the same shape as before but are inside fittings, instead of being machined or cast in the spacer element itself. The spacer element 61 has diametrically opposite fitting openings 62 and 63, each having a threaded portion as shown. Nozzle fittings 64 and 65 are located in the bottom of each fitting opening, and flanged end conduits 66 and 67 are butted against the nozzle fittings. The conduits are not as larger as the spacer element fitting openings and are held therein by sleeves 68 and 69 disposed over the conduits adjacent their flanged ends, the sleeves having external treads engaged with those of said spacer element fitting openings.

As mentioned, the fittings etc. shown in FIGURE 5 do not change the shape of the inlet passages themselves, so that water directed therethrough will still strike the inner cylindrical surface at a tangent. This tangential input is responsible for producing a vortex of saline water as will be more clearly seen from the following description of operation of the apparatus.

Referring once again to FIGURE 3, it is seen that any saline water forced or directed through the inlets, such as inlet 38, will move along the surface of ridge 31 and thus follow a circular path. This saline water will be confined by end plate 42 and collar member 13 so that it builds up in a rather flat swirl. When the saline water builds up high enough it overflows into cylinder 10 and spirals down the length of the cylinder in a long vortex. At end 12 of cylinder 10 the saline water flares out into a flat swirl again and empties through outlet 51.

Because of the manner in which the saline water enters cylinder 10, the linear velocity of the saline water in the cylinder is greater than the linear velocity of the saline water streaming from inlets 38 and 39. The apparatus has been designed to utilize the principle of conservation of angular momentum which states that, among other things, the linear velocity of a body following a circular path will increase if the body spirals inwardly.

The flared mouth of hole section 17 facilitates the inward spiraling of saline water into cylinder 10. There are, of course, other ways to accomplish the same thing. And too, it is not necessary to utilize the principle of conservation of momentum, for the inlets can be made a part of cylinder 10 if desired, and the water pumping pressure adjusted to effect the desired vortex within the cylinder. Still another alternative would be to dispose inlets along the length of the tube. In order to obtain a fairly well centralized and cylindrically shaped vortex, however, the inlets should be diametrically opposite each other, as inlets 38 and 39, and the pumping pressure supplied to such opposing inlets should be substantially the same. An easy way to achieve this is to have them both connected to the same pump.

As the saline water moves along the length of the cylinder it is heated thereby, the cylinder being heated by steam coursing through the duct 59. The heat causes vaporization of the vortex, as previously explained, and fresh water vapor fills the central area of the cylinder and vortex. It is also recalled that the temperature of the steam in duct 59 necessary to produce this fresh water vapor is much less than would be required for ordinary "duct" flow of water.

As the fresh water vapor is produced it fills the open center area of the apparatus and vortex. A very slight vapor pressure will cause the vapor to move through vapor vent 53 and on through vapor outlet 57 of chamber 54. The vapor can then be condensed into fresh water. Any saline water that may spill through vapor vent 53 will collect on floor 55 of chamber 54 and then drain out through water drain 56.

The brine that is caused by the vaporization of fresh water is carried down the center of the vortex and empties through the outlet with the rest of the saline water. Depending on the overall conversion system employed, it may be desired to use both the heat energy and kinetic energy of the exiting saline water. If this is the case then a different outlet (or outlets) configuration could be employed to maximize the utilization of these energies.

Some other alternatives that could be employed include a somewhat tapered tube instead of a cylinder, the variation of heat flux along the length of the cylinder or tube, and a different heat source. As to the latter, electrical resistance heating, gas jets, and nuclear reactor fuel elements are only a few of the many possible heat sources.

Then too, the vapor collection system shown in FIGURE 3 is not the only possible approach. Another way to collect the vapor, and at the same time eliminate the need for a water trap, would be to extend a piccolo like tube down the center of cylinder 10 and through one or both of the end plates. The vapor would enter the tube through its many holes and flow therethrough due to the vapor pressure in the cylinder. Any saline water that might possibly enter the tube would empty right out again through its many holes.

From this, it is seen that while certain preferred embodiments of the instant invention have been specifically disclosed, it is understood that the invention is not limited thereto as many variations will be readily apparent to those skilled in the art and the invention is to be given its broadest possible interpretation within the terms of the following claims:

What we claim is:

1. A method of vaporizing saline water comprising the steps of effecting a relatively shallow cylindrically shaped vortex of selected saline water, immediately materially reducing the diameter of said vortex by passing same into an elongate generally cylindrical member, moving said vortex longitudinally of said member, applying heat to the exterior of said vortex while same is in said longitudinal movement, said heat being sufficient to produce vaporization at the interior of the vortex but insufficient to produce vaporization at its exterior, thereafter immediately materially increasing the diameter of the said vortex to effect a shallow cylindrically shaped vortex by passing same from said cylindrical member, withdrawing the non-vaporized portion of said saline water from the perimeter of said increased diameter vortex while at the same time recovering from the center of said vortex the water vapor produced by said heating.

2. A method of vaporizing saline water comprising the steps of effecting a relatively shallow cylindrically shaped vortex of selected saline water, immediately materially reducing the diameter of said vortex by passing same into an elongate generally cylindrical member, moving said vortex longitudinally of said member, applying heat to the exterior of said vortex while same is in said longitudinal movement, said heat being sufficient to produce vaporization at the interior of the vortex but insufficient to produce vaporization at its exterior, and recovering from the center of said vortex the water vapor produced by said heating.

3. Saline water vaporization apparatus comprising a tube member having a substantially cylindrical inner wall, said tube member having first and second ends, said first end including a shallow cylindrical chamber of a diameter materially greater than that of said substantially cylindrical inner wall and a flared intermediate portion joining said chamber and said inner wall, said tube member having an inlet arranged to permit a stream of liquid to be directed tangentially into said shallow cylindrical chamber and through said intermediate flared portion, said flared portion causing such liquid to rapidly and smoothly converge and pass interiorly of said inner cylindrical wall at a linear velocity materially greater than that at which it entered said chamber, said tube member at its second end including a shallow cylindrical exit chamber of a diameter materially greater than that of said inner wall and a flared intermediate portion joining said exit chamber with said inner wall, said tube member having an outlet arranged to permit withdrawal of saline liquid from the periphery of said exit chamber as said saline liquid passes from the cylindrical wall portion of the tube member and rapidly diverges into said exit chamber, said tube member being capable of heat transfer, means associated with said tube member for supplying heat thereto, and means associated with said tube member for collecting water vapor therefrom.

4. Saline water vaporization apparatus comprising a duct member closed at one end and open at the other end and having an intermediate portion of substantially cylindrical interior, said duct member having formed at its closed end and its open end inlet and outlet chambers, respectively, each of said chambers being of shallow cylindrical shape and of diameters materially greater than that of the interior of said intermediate portion, said duct member further having an inlet disposed substantially adjacent said intermediate portion and arranged so as to direct liquid forced therethrough into a stream and into said inlet chamber, thereby to effect a vortex within said inlet chamber, said duct member being capable of heat transfer, means associated with said duct member for supplying heat thereto, and means associated with said open end of said duct member for separating emerging liquid from emerging liquid vapor.

5. Saline water vaporization apparatus comprising a tube member having a substantially cylindrical inner wall and having at one of its ends a shallow cylindrical chamber of a diameter materially greater than that of said substantially cylindrical inner wall, said tube member having an inlet arranged to permit a stream of liquid to be directed tangentially into said shallow cylindrical chamber, said tube member being capable of heat transfer, means associated with said tube member for supplying heat thereto, and means associated with said tube member for collecting water vapor therefrom.

6. Saline water vaporization apparatus comprising a tube member having a substantially cylindrical inner wall, said tube member having first and second ends, said first and including a shallow cylindrical chamber of a diameter materially greater than that of said substantially cylindrical inner wall and a flared intermediate portion joining said chamber and said wall, said tube member having an inlet arranged to permit a stream of liquid to be directed tangentially into said cylindrical chamber and through said intermediate flared portion, said flared portion causing such liquid to rapidly converge and pass interiorly of said cylindrical inner wall at a linear velocity materially greater than that at which it entered said chamber, said tube member having an outlet disposed therein essentially adjacent said second end, said outlet arranged to provide an exit for liquid within said tube member, said tube member being capable of heat transfer, means associated with said tube member for supplying heat thereto, and means associated with said tube member for collecting water vapor therefrom.

7. Saline water vaporization apparatus comprising a substantially longitudinal member capable of heat transfer and having a longitudinal cylindrical passage therethrough, said cylindrical passage having first and second open ends, first and second collars secured adjacent the respective first and second open ends, each collar having a hole therethrough of such a size and so arranged as to effect an extension of said cylindrical passage through each collar, said collar holes each being flared at the ends of said cylindrical passage, first and second spacer elements positioned adjacent each collar, each spacer element having a cylindrical hole therethrough of materially greater cross sectional area than that of the cylindrical passage, said spacer element holes being concentrically positioned with respect to said collar holes, a first end plate positioned over and closing off said hole in said first spacer element and defining therewith a shallow large diameter inlet chamber, said first spacer element having a constricted fluid inlet in communication with the cylindrical hole therein arranged in such a manner that fluid flowing through said inlet will enter said cylindrical hole in a concentrated stream on a tangent to the cylindrical periphery thereof, and a second end plate positioned over said hole in said second spacer element to define therewith a shallow large diameter outlet chamber, said second end plate having a vapor outlet therethrough positioned substantially centrally with respect to said second spacer element hole, said second spacer element having a fluid outlet in communication with the cylindrical periphery of said hole therein.

8. Saline water vaporization apparatus comprising a substantially longitudinal member capable of heat transfer and having a longitudinal cylindrical passage therethrough, said cylindrical passage having first and second open ends, first and second collars secured adjacent the respective first and second open ends, each collar having a hole therethrough of such a size and so arranged as to effect an extension of said cylindrical passage through each collar, said collar holes each being flared at the ends of said cylindrical passage, first and second spacer elements positioned adjacent each collar, each spacer element having a cylindrical hole therethrough of materially greater cross sectional area than that of the cylindrical passage, said spacer element holes being concentrically positioned with respect to said collar holes, a first end plate positioned over and closing off said hole in said first spacer element and defining therewith a shallow large diameter inlet chamber, said first spacer element having a fluid inlet of reduced diameter in communication with the cylindrical hole therein arranged in such a manner that fluid flowing through said inlet will enter said cylindrical hole in a narrow stream on a tangent to the cylindrical periphery thereof, and a second end plate positioned over said hole in said second spacer element to define therewith a shallow large diameter outlet chamber, said second end plate having a vapor outlet therethrough positioned substantially centrally with respect to said second spacer element hole, said second spacer element having a fluid outlet in communication with the cylindrical periphery of said hole therein, and a chamber positioned adjacent said vapor outlet for trapping any liquids that may pass through said vapor outlet, said chamber having a bottom set below said vapor outlet, said bottom containing an outlet for liquids, and said chamber having a vapor exit positioned above said bottom.

References Cited in the file of this patent

UNITED STATES PATENTS

| | | |
|---|---|---|
| 1,516,285 | Freeland | Nov. 18, 1924 |
| 1,741,887 | Stratford et al. | Dec. 31, 1929 |
| 2,545,028 | Haldeman | Mar. 13, 1951 |
| 2,734,023 | Hickman | Feb. 7, 1956 |